United States Patent Office 3,532,514
Patented Oct. 6, 1970

3,532,514
PROCESS FOR PREPARING MEAT-FLAVORED
COMPOSITIONS
Charles Gerard May, St. Neots, England, assignor to Lever Brothers Company, New York, N.Y., a corporation of Maine
No Drawing. Filed Mar. 8, 1966, Ser. No. 532,564
Claims priority, application Great Britain, Mar. 10, 1965, 10,161/65
Int. Cl. A23l 1/26
U.S. Cl. 99—140                  5 Claims

ABSTRACT OF THE DISCLOSURE

A process for preparing savory meat-flavored compositions in which a mixture of an amino acid, a carbohydrate and a fatty material is heated in the presence of water at a temperature of at least 60° C. until the flavor is produced.

---

The present invention relates to artificial flavouring substances and to their preparation.

The invention provides a process for making a flavouring substance in which a mixture comprising a carbohydrate, at least one amino acid and a fatty material is heated in the presence of water.

The carbohydrate may be a pentose, for example, ribose, arabinose or xylose or a hexose, for example, glucose. Pentoses generally give rise to flavours resembling those of cooked meats, whereas hexoses, when used in the absence of a pentose, usually tend to give a substance having a savoury smell and taste. It may be advantageous to use a mixture of monosaccharides which may contain either pentoses or hexoses or both.

Di-, tri- or polysaccharides, or simple derivatives of mono-, di-, tri- or polysaccharides which yield a monosaccharide under the conditions of reaction, may also be used. As suitable monosaccharide derivatives that may be employed may be mentioned monoacetone glucose and methyl riboside.

The amino acid may be a single amino acid or a mixture of two or more acids. A wide range of amino acids may be employed in accordance with the invention. However, phenylalanine and methionine tend to give undesirable floral or potato-like aromas and non-meat-like flavours and large amounts of other aromatic amino acids, for example tyrosine and tryptophan, are preferably avoided, although small amounts may not be objectionable.

The amino acid used according to the invention may also be obtained by hydrolysis of proteins of animal or vegetable origin. Good results are obtained with acid- or enzyme-hydrolysed wheat gluten, soya protein and casein.

Preferably the amino acid comprises cysteine or cystine, or such derivatives of these that will give rise to them under the reaction conditions employed. Such derivatives include suitable salts, esters, hydroxy compounds, peptides and proteins. Generally cysteine or derivatives giving rise to cysteine are preferred to cystine.

The taste, odour and colour of the product are influenced by the relative quantities of amino acid and carbohydrate used. Although the components of the reaction mixture may be used in widely varying proportions, an excessive amount of carbohydrate may give rise to excessive sweetness of flavour, or may result in caramellisation during heating at high temperatures. Generally, it is preferred to use amino acid and carbohydrate in weight ratios between 2:1 and 2:5, while optimal results may be obtained using weight ratios between 1:1 and 1:2.

The fatty material may be a fat, an oil, or a higher fatty acid; the type of flavour obtained is affected by the type of fatty material used. For instance, lard may give rise to a cooked chicken flavour, while palmitic acid may produce the flavour of roast pork and oleic acid the flavour of roast mutton.

The type and intensity of flavour produced is also influenced by the amount of fatty material present. The use of as little as 1% by weight of the fatty material, calculated on the total non-aqueous constituents, may give a satisfactory flavouring substance, but it is preferred that the reaction mixture, excluding water, should contain between 5 and 40% by weight of fatty material. If desired greater proportions of fatty material may be used.

The amount of water present is suitably at least 5, preferably 15 to 25 times the amount by weight of the total carbohydrate. Amounts up to 1500 times may, however, be used.

The pH at which the reaction is carried out is not critical, although the pH of the mixture at the end of the reaction must not be alkaline. It is preferred to carry out the reaction at a pH of between 3 and 6.

Stirring of the mixed reactants during heating is desirable in order to reduce the risk of local overheating and to disperse the fatty ingredients. Vigorous stirring during heating may reduce the time required for completion of the reaction. The temperature of reaction is not critical; suitably it is higher than 60° C. and preferably higher than 80° C. The reaction may be carried out by heating the mixture under reflux, in which case the mixture is generally maintained at its boiling point for from ¼ to 4 hours, generally for at least 1 hour. At lower temperatures, for example 70° C., a rather longer heating time may be necessary, for example 24 to 30 hours. The process may also be carried out under reduced pressure or under increased pressure, when lower or higher temperatures, respectively, will be necessary to maintain the mixture at or near its boiling point, and heating times will usually be adjusted accordingly.

The reaction products may be used as such or concentrated to give a thick paste or they may be converted into powder by any suitable method of drying. When spray-drying it is desirable first to disperse the fat with a suitable emulsifying agent for example glyceryl monostearate, and then mix it with an inert vehicle, for example cornflour, suitable for use in the spray-drying process.

The reaction may also be carried out in the presence of the food product in which it is desired to incorporate a savoury or meat-like flavour and heating the product to effect reaction, for instance by autoclaving in a sealed can. When carrying out the reaction by adding the reactants to a food product it may be necessary to add a small amount of water, but generally such products will already contain sufficient water to enable the reaction to proceed.

Flavouring substances according to the invention may be incorporated in a wide range of meats or meat-like products. They may, for instance, be incorporated either as solutions or powders, in protein gels, in luncheon meats, in dry soup mixes and in meat spreads.

The following examples illustrate the invention.

EXAMPLE 1

Wheat gluten hydrolysate, cysteine hydrochloride, xylose and oleic acid dispersed in water, were heated, with stirring under reflux for 2 hours, on an oil bath at 120° C. After cooling to 50° C., an aqueous cornflour slurry was added with stirring and the resulting mixture spray-dried to a yellowish-brown powder. This product, when dispersed in a little water, had the flavour and odour of roast mutton.

The proportions of each constituent used were as follows:

Wheat gluten hydrolysate—480 g.
Cysteine hydrochloride—56 g.

Xylose—70 g.
Oleic acid—50 g.
Water—1500 ml.
Cornflour—400 g. in 600 ml. water

EXAMPLE 2

This example follows that of Example 1, except that the oleic acid was replaced by palmitic acid. A product with the flavour and odour of roast pork was obtained.

EXAMPLE 3

The following ingredients were mixed and heated under reflux for 2 hours.

Wheat gluten hydrolysate—239 g.
Cysteine hydrochloride—25 g.
Xylose—15 g.
Lard—127 g.
Water—1000 ml.

The fat remained above the aqueous phase. Glyceryl monostearate (containing 33–40% monoglyceride), 5 g., was added, the mixture allowed to cool to 80 to 85° C. and cornflour, 196 g. then added with vigorous stirring. After 10 minutes, the mixture was homogenised and then spray dried. The resulting powder imparted a good chicken flavour to a bland soup base.

What is claimed is:
1. A process for preparing savory meat flavor compositions which comprise preparing a mixture comprising:
  (a) cysteine,
  (b) a mono-saccharide selected from the group consisting of pentose and hexose monosaccharides,
  (c) a fatty material selected from the group consisting of fatty acids and fatty acid triglycerides, and heating said mixture in the presence of water at a temperature of at least 60° C. until a savory meat flavor is produced, the weight ratio of cysteine to monosaccharide in the mixture being from 2:1 to 0.4:1 by weight and the final pH of the mixture being no more alkaline than pH 7.

2. A process according to claim 1, in which the ratio of cysteine to mono-saccharide is 1:1 to 1:2.

3. A process according to claim 1, in which by weight, the amount of water present in the mixture is at least five times the amount of the mono-saccharide.

4. A process according to claim 1, in which the fatty material is an aliphatic fatty acid selected from the group consisting of palmitic acid and oleic acid.

5. A process according to claim 1, in which the mixture additionally comprises a food product to be flavored, and the heating of the reactant is carried out in situ in the food product.

References Cited
UNITED STATES PATENTS

| | | | |
|---|---|---|---|
| 2,934,437 | 4/1960 | Morton et al. | 99—140 |
| 3,365,306 | 1/1968 | Perret | 99—140 |
| 3,394,015 | 7/1968 | Giacino | 99—140 |

OTHER REFERENCES

Hornstein et al.: "Journal of Agriculture and Food Chemistry," vol. 8, No. 6, 1960, pp. 494–498.

O. F. Batzer et al.: J. of Ag. Food Chem. vol. 10, pp. 94–96 (1962).

MAURICE W. GREENSTEIN, Primary Examiner